INVENTORS
FRANK W. BROOKS
JAMES O. HELVERN
BY
THEIR ATTORNEY

2

United States Patent Office 3,102,453
Patented Sept. 3, 1963

3,102,453
BRAKE BOOSTER REACTION MECHANISM
Frank W. Brooks, Dayton, and James O. Helvern, Lewisburg, Ohio, assignors to General Motors Corporation, Detroit, Mich., a corporation of Delaware
Filed Aug. 7, 1961, Ser. No. 129,715
1 Claim. (Cl. 91—369)

This invention relates to brake boosters for power actuation of the brakes of a motor vehicle.

An object of the invention is to provide a simplified mechanical lever reaction transmission system for proportioning the reaction effect transmitted to the foot of the operator as brake "feel," which mechanism can be produced at a reduced cost.

Further objects and advantages of the present invention will be apparent from the following description, reference being had to the accompanying drawings wherein preferred embodiments of the present invention are clearly shown.

Figure 1:
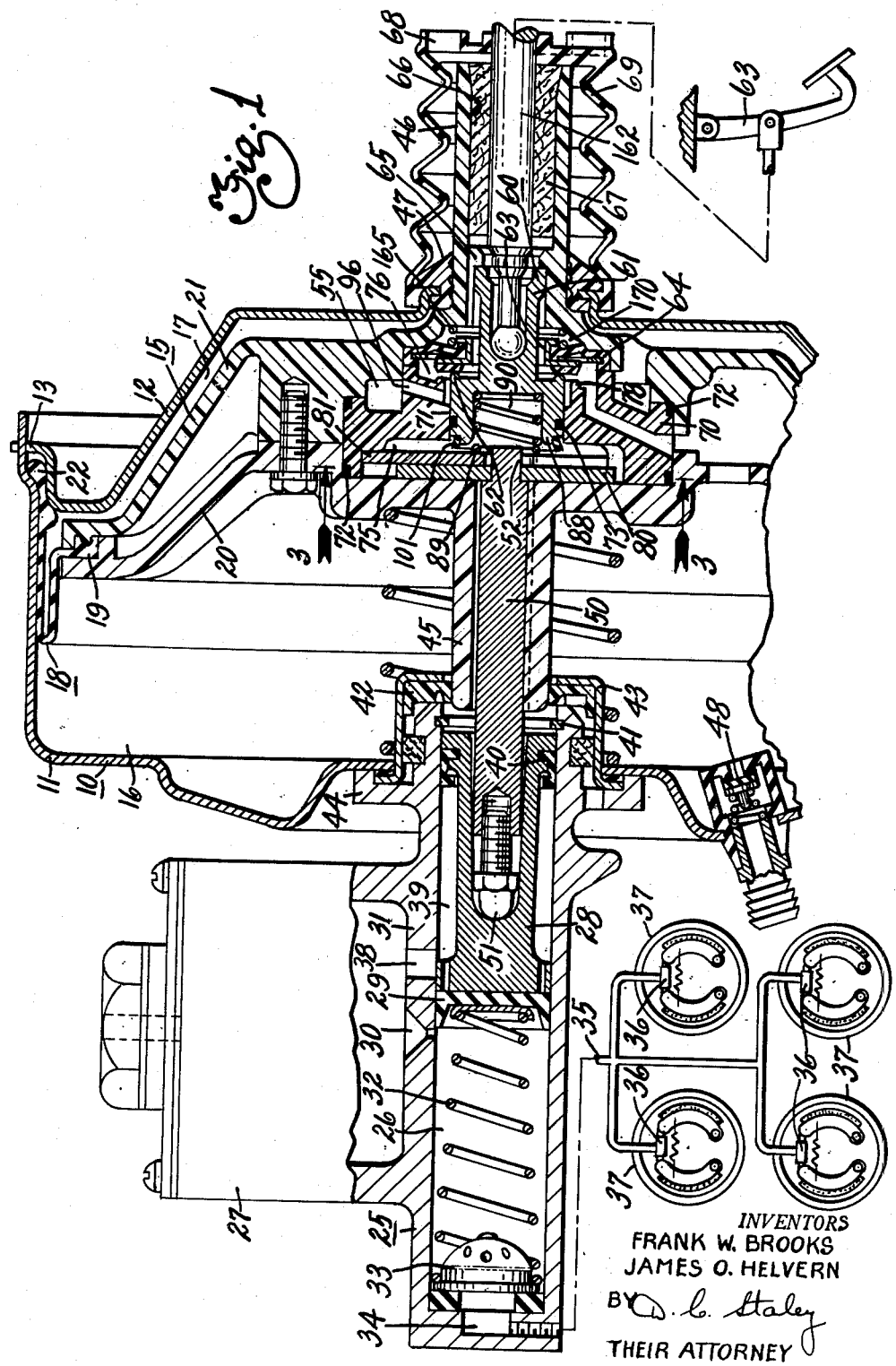
FIGURE 1 is a longitudinal cross-sectional view of a power brake booster incorporating features of this invention.

The power brake booster of this invention includes a casing 10 comprising two shell members 11 and 12 secured together by a bayonet lock arrangement 13. The casing 10 includes a pressure differential responsive movable wall 15 that divides the casing 10 into two compartments 16 and 17 at opposite sides of the movable wall 15, the movable wall including a rolling diaphragm 18 having its inner peripheral edge 19 secured between the wall members 20 and 21 of the movable wall and its outer peripheral end 22 secured between the shells 11 and 12.

The shell 11 supports a master cylinder 25 having a master cylinder bore 26, a reservoir 27 being integral with the master cylinder 25. A master cylinder piston 28 is reciprocable in the cylinder bore 26 and has a cup seal 29 at the forward end thereof positioned just rearwardly of the fill port 30 provided in the bottom wall 31 of the reservoir 27 for filling the cylinder bore 26 when the piston 28 is in the retracted position shown in FIGURE 1. A compression spring 32 extends between the piston 28 and a residual pressure check valve 33 which controls fluid flow to and from the outlet passage 34 which in turn is connected by the conduit 35 with the wheel cylinders 36 of the brakes 37 of the motor vehicle. The reservoir bottom wall 31 also has a port 38 adapted for communication with the annular chamber 39 provided between the opposite ends of the piston 28 to prevent cavitation in the cylinder bore 26 on a fast return stroke of the piston. The piston 28 has a seal member 80 at the rear end thereof and the piston is adapted to engage a stop ring 41 when in the retracted position. A seal member 42 is carried in a cap 43 that is secured to the shell 11 by the flange portion 44 of the master cylinder 25, the seal member 42 also supporting the forward extending wall projection 45 of the movable wall 15.

The movable wall 15 also has a rearward cylindrical projection 46 supported by a seal member 47, thereby closing the chambers 16 and 17 against atmosphere, chamber 16 being connected with a suitable source of vacuum, or subatmospheric pressure, through a check valve 48, such as the manifold of the engine of a vehicle.

A power plunger 50 has its forward end 51 engaging the master cylinder piston 28 and its rearward end 52 connected with the movable wall 15 in a manner hereinafter described.

Figure 2:
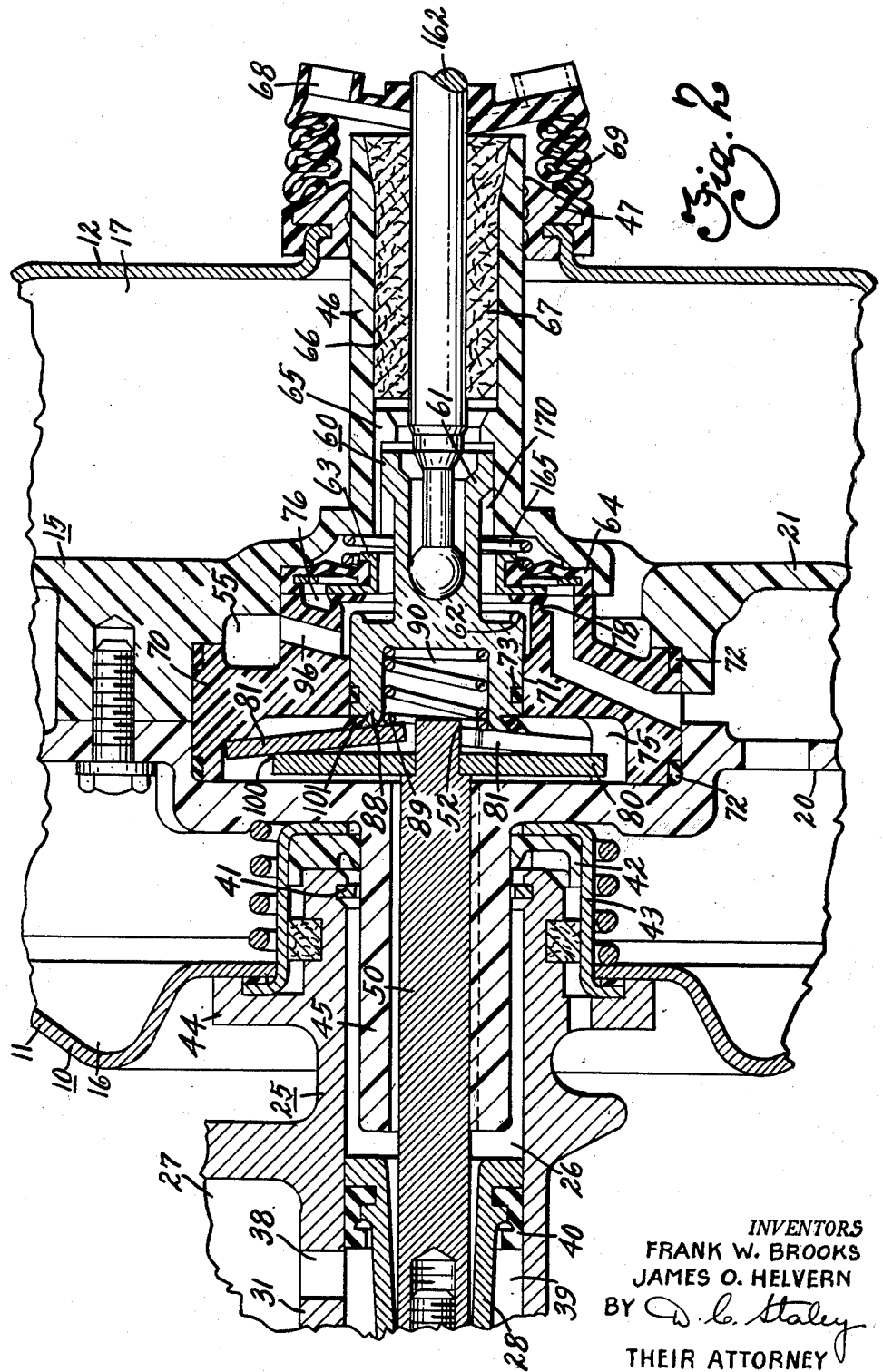
FIGURE 2 is an enlarged cross-sectional view similar to FIGURE 1 but illustrating the mechanism in an operating position.
Figure 3:
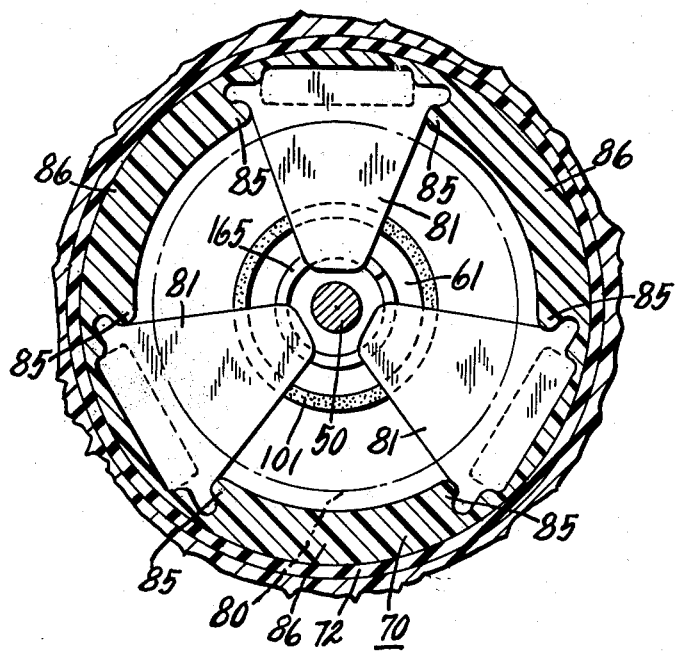
FIGURE 3 is a cross-sectional view taken along line 3—3 of FIGURE 1 illustrating the reaction lever system of this invention.

The wall members 20 and 21 of the movable wall 15 each has annular axial recesses that cooperate to form a chamber 55 which receives a follow-up control valve mechanism 60 that has one position illustrated in FIGURE 1 wherein equivalent pressures are established in chambers 16 and 17 so that the movable wall 15 remains inactive and a second position shown in FIGURE 2 wherein there is a pressure differential between the chambers 16 and 17, pressure being increased in chamber 17 by admission of atmospheric air thereto, by which the movable wall member 15 is activated to place the power unit on a power stroke to effect operation of the brakes of the vehicle.

The follow-up control valve mechanism 60 consists of a manually operated valve member 61 engaged by one end of a manually operated plunger 162 which in turn is connected through suitable linkage with the brake pedal 63 of the vehicle. The valve member 61 has an annular air valve seat 62 that engages a valve member 63 which is supported on a diaphragm 64 and urged against the air valve seat 62 by means of a spring 165 when the valve mechanism is in the position illustrated in FIGURE 1. The extension 46 of the movable wall 15 has a central bore 66 containing a filter 67 through which atmospheric air is admitted through an opening 68 in a dirt boot 69 for delivery to the air chamber 170 positioned annularly around the valve member 61, valve seat 62 and valve member 63 retaining atmospheric air from admission into chambers 16 and 17 when the brake booster is in the position shown in FIGURE 1 at all times when the brakes are in released or inactive position.

The valve member 61 is slidably positioned in an axial bore 71 provided in a carrier member 70 which in turn is positioned in the chamber 55 provided in the movable wall 15 and retained between the two wall members 20 and 21, suitable seals 72 being provided between the movable wall 15 and the carrier 70. A seal member 73 is provided around the valve element 61 in the portion thereof in slidable engagement with the bore 71 to close communication between a chamber 75 formed between the carrier 70 and the wall 20 and the vacuum chamber 76 provided around the valve element 63.

The carrier 70 is provided with a vacuum valve seat 78 also adapted to engage valve element 63 when the valve member 61 is moved forward to the position shown in FIGURE 2 whereby to close the vacuum chamber 76 and open chamber 55 to communication with the air chamber 65 for delivery of atmospheric air to the chamber 17 of the brake booster and effect a pressure differential between opposite sides of the movable wall 15 and cause the wall to move in a forward direction on a power stroke.

To provide for transmission of a reaction effect or force to the manually controlled valve 61 and thereby provide for brake "feel" to the operator of the vehicle, the power plunger member 50 is provided with a flat reaction disc member 80 that is a press fit on the end of the member 50 and positioned within the chamber 75. Thus, the disc 80 and the member 50 move as a unit. A plurality of flat lever members are positioned in the chamber 75 between the flat disc 80 and the end portion of the valve member 61 that extends into the chamber 75 so that the fingers 81 can be engaged by the disc 80 as well as by the valve member 61.

These lever members 81 are pivotally supported on the carrier 70 on ledges 85 provided on the carrier 70 at opposite ends of the raised or boss portions 86. The levers 81 are therefore free for pivotal action from their outer ends that are positioned radially outside the periphery of the disc 80. The inner ends of the levers 81 are positioned between the flat disc 80 and the end portion 88 of the movable valve member 61, a spring 89 being placed in a chamber recess 90 that is axial of the valve member 61 normally to maintain the levers 81 in flat engagement with the flat disc 80, as shown in FIGURE 1. Also the spring 89 maintains the valve member 61 out of engagement with the lever members 81 and moves the valve element 63 away from the vacuum seat 78 so that spring 165 can retain the valve member 63 on the air seat 62.

In operation, the chambers 16 and 17 are normally under the same subatmospheric pressure, or vacuum, check valve 48 being connected with the manifold of the engine of the vehicle, vacuum valve 78 being open and air valve 62 being closed so that in the inactive or retracted position of the brakes and brake booster, the device will assume the position of its respective parts as shown in FIGURE 1.

On operator movement of the brake pedal 63, plunger 162 is moved forward or in a left-hand direction against the action of spring 89 until the valve element 63 seats on the vacuum seat 78, thereby closing chamber 55 against further connection with the chamber 16 so that slight additional movement of the valve member 61 in a left-hand direction will thereafter open the air valve seat by removing it from the valve member 63 to provide for atmospheric air to enter chamber 55 from chamber 170 through the port 96 and thereby supply air to the chamber 17 for power movement of the movable wall 15 in a left-hand direction. Such a position of the valve elements is illustrated in FIGURE 2 wherein the movable wall 15 has passed through a part of its power stroke so that the master cylinder piston 28 has moved forward into the master cylinder bore 26 to displace hydraulic fluid into the wheel cylinders of the brakes for applying the brakes.

When hydraulic pressure builds up in the cylinder bore 26, the force effect reacts against the piston 28 and thereby against the power plunger 50 in a right-hand direction to move the reaction disc 80 in a right-hand direction against the plurality of levers 81 to cause them to pivot about their outer ends, as shown in FIGURE 2. At this time the peripheral corner 100 of the disc 80 will form substantially a line contact with the levers 81 to provide for a minimum of friction contact therebetween to urge the levers in a right-hand direction so that their inner ends first engage the resilient rubber bumper 101 provided as an annulus on the end of the valve member 61 and then to compress the bumpers until the levers directly engage the valve member as shown in FIGURE 2.

The levers 81 transmit the reaction force partially to the movable wall 15 and partially to the manual control plunger 162 through the valve member 61 so that a part of the total reaction force is transmitted to the plunger 162 to give the operator of the vehicle a brake "feel."

While the embodiments of the present invention as herein disclosed constitute preferred forms, it is to be understood that other forms might be adopted.

What is claimed is as follows:

A brake booster mechanism comprising, a fluid pressure operated motor including a casing having a pressure differential responsive movable wall operable therein, reaction responsive output means connected to said movable wall by a power plunger member for actuation thereby, a follow-up control valve mechanism carried by said movable wall having one position to establish equivalent pressures on opposite sides of the wall to inactivate the same and a second position to extablish differential pressures on opposite sides of said wall to activate the same including a manually movable valve member slidable in said movable wall, a reaction element comprising a flat disc secured on said plunger member adjacent said movable valve member, a plurality of flat force transmission levers in pivotal suspension at one end on said movable wall with their opposite end between said disc and said movable valve member and engaged by the same on opposite sides of said levers, said levers being pivotally movable on said disc on a peripheral corner of the said disc provided between a flat face of said disc and a peripheral axial edge thereof to provide for line contact between said disc and said levers for pivotal action therebetween, said movable valve means including an annular resilient rubber-like ring on one end thereof engaged initially by said levers in the pivotal action of said levers relative to said valve member and said disc, and spring means between said levers and said movable valve member normally retaining said levers in flat engagement with said disc and said movable valve member out of engagement with said levers.

References Cited in the file of this patent
UNITED STATES PATENTS

| | | |
|---|---|---|
| 2,832,316 | Ingres | Apr. 29, 1958 |
| 2,894,490 | Ingres | July 14, 1959 |
| 2,900,963 | Ayers | Aug. 25, 1959 |
| 3,033,173 | Bauman | May 8, 1962 |